United States Patent

Steele et al.

[15] 3,696,488
[45] Oct. 10, 1972

[54] SEPARATION SYSTEM

[72] Inventors: Michael F. Steele, Costa Mesca; John S. Yates, Placentia, both of Calif.

[73] Assignee: The Susquehanna Corporation, Fairfax County, Va.

[22] Filed: Dec. 21, 1970

[21] Appl. No.: 99,917

[52] U.S. Cl. ..............................................29/200 D
[51] Int. Cl. ..............................................B23p 19/04
[58] Field of Search......29/200 D, 200 R, 208, 200 B

[56] References Cited

UNITED STATES PATENTS 3,114,962   12/1963   Brown ....................29/200 D

*Primary Examiner*—Thomas H. Eager
*Attorney*—Tipton D. Jennings

[57] ABSTRACT

A mechanical separation system is disclosed which includes a stud member and a stud housing maintained in mating engagement by a piston. The stud member has a plurality of externally-threaded segments fingers which can be formed in an overall conical shape so that the major diameter of the threaded portion of the conically-shaped fingers is less than the minor diameter of the corresponding internal threads in the stud housing. The piston is positioned within the segmented fingers of the stud member to force the fingers radially outwardly so that the threaded portions mate with the corresponding threads in the stud housing. Separation of the stud member from the stud housing is accomplished by displacing the piston to allow the stud fingers to move inwardly to assume a conical shape. The externally threaded portion of the stud member is thus disengaged from the internal threads of the stud housing to permit separation of the stud member from the stud housing. In an alternative embodiment, the fingers of the stud member are not formed into a conical shape prior to use, but the energy imparted to the fingers as they are threaded into the stud housing is sufficient to cause the fingers to be deflected inwardly and to disengage from the housing when the piston member is forced out of contact with the end portions of the fingers.

13 Claims, 4 Drawing Figures

INVENTORS
MICHAEL F. STEELE
JOHN S. YATES
BY Martha L. Ross
AGENT

PATENTED OCT 10 1972 3,696,488

SEPARATION SYSTEM

BACKGROUND AND SUMMARY OF THE INVENTION

The present invention relates to a mechanical separation system. More particularly, the present invention relates to a mechanical separation system which is capable of withstanding high tensile and compression loads while capable of being actuated to effect separation by a relatively small force.

Many separation mechanisms in use today, including pyrotechnic actuated thrustors, employ the brute force method of accomplishing separation. This method of separation consists of fracturing or rupturing the main load carrying components of the mechanism to effect mechanical release and structural separation. Such prior art mechanisms require that the devices with which such separation mechanisms are employed be capable of withstanding extreme forces during the separation process. In addition, many of these devices must employ special shrouds to contain fragments and to provide safety for personnel handling such devices.

By the present invention there is provided a separation mechanism which does not require the fracturing of any load-carrying components. The force necessary for actuation and subsequent separation of the mechanism of the present invention is a function of the torque applied to the mechanism during assembly; hence selection of the energy-producing actuator is simple and straight forward. The axial tensile or compression load-carrying capability of the separation mechanism can be many times greater than the actuation force. In addition, all components of the mechanism can be completely captive after separation within the assemblies which are being separated and may be reused without degradation to performance. Special shrouds for containing fragments obtained in the separation process as in prior art devices are therefore unnecessary. Also, simplicity of design enables the mechanism to be produced economically with a high degree of performance reliability.

The separation system of the present invention includes an internally threaded stud housing, and a stud member having a plurality of externally-threaded segmented projections or fingers which can be formed in an overall conical shape. The major diameter of the threaded portion of the conically-shaped fingers is less than the minor diameter of the corresponding internal threads in the housing for the stud member. A piston member is adapted to be positioned within the segmented fingers of the stud member to expand or flex the fingers radially outwardly so that the threaded portions of the stud member can engage the corresponding threads in the stud housing. Separation of the stud member from the stud housing is accomplished by displacement of the piston within the stud member to allow the fingers of the stud member to move inwardly sufficiently to disengage the threaded portions of the fingers from the internal threads of the stud housing. Separation may also be effected by displacing the piston outwardly from the stud member. In an alternative embodiment, the projections or fingers are not formed into a conical shape prior to use but extend parallel to the longitudinal axis of the stud member. In this latter embodiment, energy developed when the fingers are threaded into the stud housing causes the fingers to move inwardly sufficiently to disengage the threaded portions of the fingers from the internal threads of the stud housing when the piston member has been displaced from engagement with the extremities of the fingers.

DESCRIPTION OF THE PREFERRED EMBODIMENTS

Figure 1:
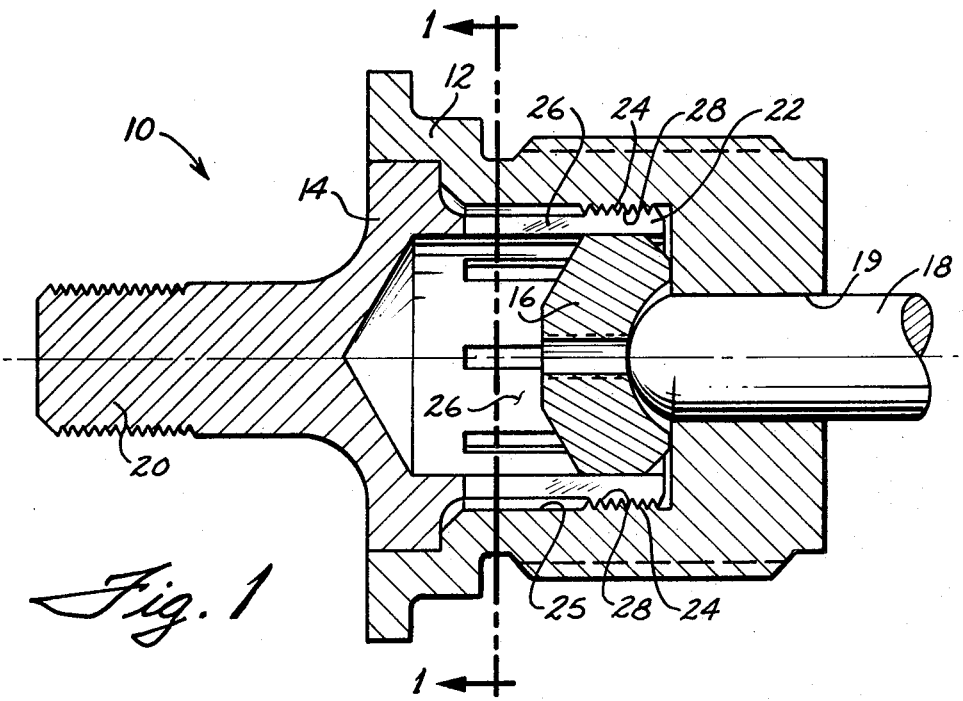
FIG. 1 is a side elevational view in cross-section showing the separation mechanism constructed in accordance with the principles of the present invention with the fingers of the stud member flexed outwardly by the piston member so as to engage the stud housing.
Figure 3:
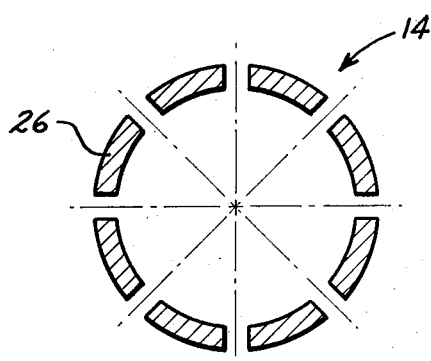
FIG. 3 is an end view in cross-section of the segmented fingers or projections of the stud member taken along line 1—1 in FIG. 1.
Figure 2:
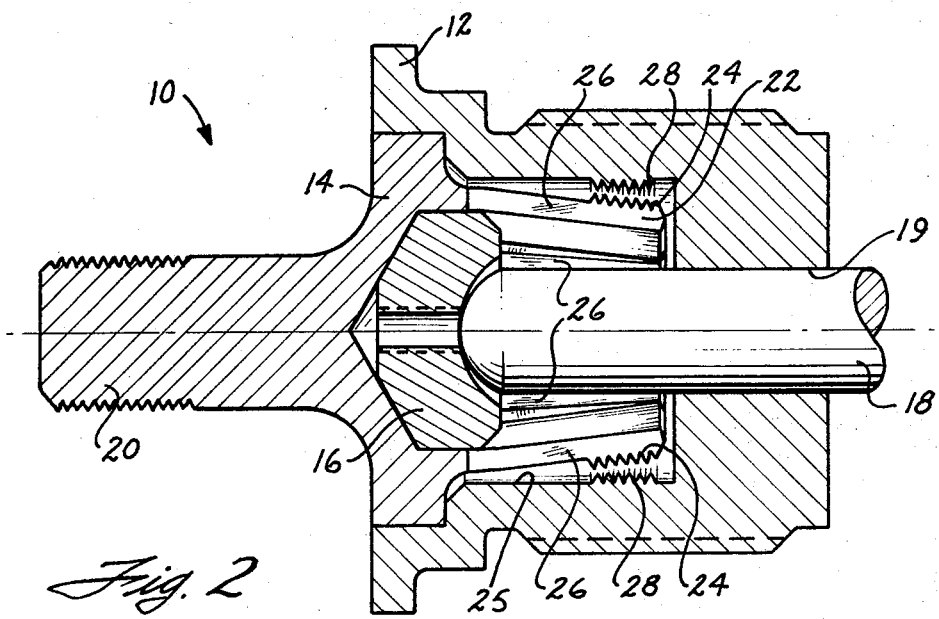
FIG. 2 is a side elevational view similar to FIG. 1 showing the piston displaced inwardly and the fingers of the stud member in an unflexed conical position.

In the embodiment of the present invention as shown in FIG. 1, 2 and 3 there is provided a separation system 10 which includes a stud housing 12, a stud member 14, a piston 16 and a shaft 18.

The stud member 14 includes a threaded shaft 20 or other suitable means for attachment of the structure or component that is to be separated. The separation end 22 of the stud member 14 is formed in a tubular shape and provided with external threads 24. Slots are formed longitudinally in the separation end 22 to provide a plurality of threaded segmented fingers or projections 26. The stud housing 12 is formed with an inner recess 25 within which the stud member 14 is receivable. There is also provided in the stud housing 12 an opening 19, preferably cylindrical in shape, through which a shaft 18 can extend. The threaded fingers 26 of the stud member 14 can be formed in a conical shape as shown in FIG. 2, by swaging or other conventional means, with the major diameter of the threads 24 on the conically-shaped stud member being less than the minor diameter of the internal threads 28 formed in the stud housing 12. The piston 16 is of cylindrical construction, preferably in the shape of a cylindrical disk, and adapted to be slidably movable within the inner circumference of the fingers 26 in the separation end 22 of the stud member 14. When installed in the stud member at the extremity of the fingers 26, the major diameter of the piston 16 is of a size sufficient to force the swaged fingers 26 of the stud member 14 to flex outwardly to their unswaged diameter as shown in FIG. 1, thus engaging the external threads 24 of the stud fingers 26 with the internal threads 28 of the stud housing 12. As previously mentioned, the stud member 14 may also be formed with the threaded fingers 26 parallel to the longitudinal axis of the stud member 14. In this configuration, the energy developed when the fingers 26 are threaded into the stud housing 12 causes the ends of the fingers to be deflected inwardly when the piston member 16 is forced out of contact with the end portions of the fingers 26, thus disengaging the external threads 24 of the fingers 26 from the internal threads 28 of the stud housing 12 and allowing the stud member to be separated from the housing.

During operation, the piston 16 can be displaced by means of a longitudinally-extending shaft 18 so that the piston 16 moves to a position within the tubular portion of the stud member 14 forward of the segmented fingers 26, thus allowing the fingers 26 to assume a conical shape in disengaged relation with the stud housing 12. The housing 12 member 14 can then be separated. In an alternative (not shown), the shaft 18 can be secured to the piston 16 so that as the shaft 18 is moved outwardly from the stud member 14, the piston 16 is forced outwardly into an opening (not shown) in the stud housing 12, thus disengaging the piston 16 from the segmented fingers 26 of the stud member 14 and allowing the segmented fingers to assume a conical shape in disengaged relation with the stud housing 12.

Figure 4:
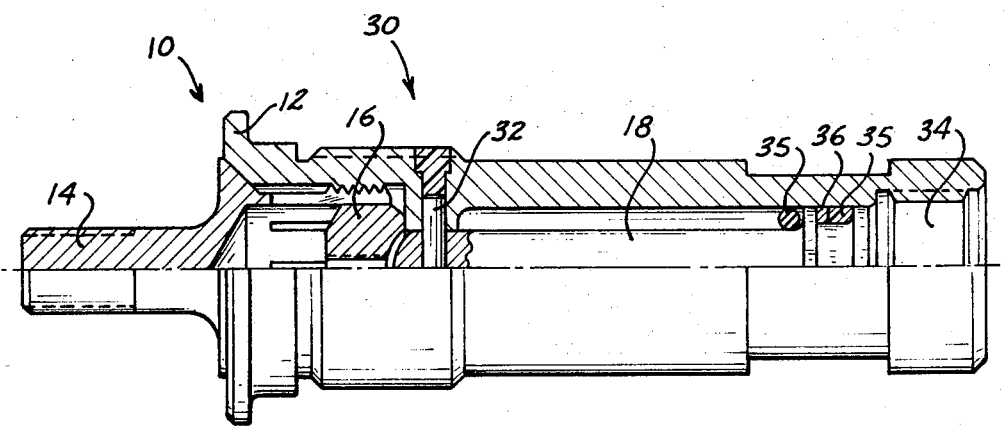
FIG. 4 is a side elevational view partly in cross-section of a thrustor mechanism which employs the separation system of the present invention.

In FIG. 4 there is shown a thrustor 30 in which the separation system 10 of the present invention can be employed. Such apparatus can include, in addition to the separation mechanism 10, a shear pin 32 for locking the shaft 18 to the housing 12 and a series of 0-rings 35 and retainer rings 36. A pressure source 34 or other means may be provided for imparting an axial force to the shaft 18 in order to displace the piston 16 located within the stud member 14 and thus to effect separation.

Assembly of the separation mechanism of FIGS. 1, 2 and 3 is accomplished by inserting the piston 16 in the tubular end of the stud member 14 and positioning the piston 16 at the outer end of the fingers 26 of the stud member 14 in order to force the fingers outwardly so that they can be joined in mating engagement with the threaded inner portion 28 of the stud housing 12. The stud member 14 is then threaded into the stud housing 12. Preferably, sufficient torque is applied to the stud member that the forces tending to maintain the union between stud member 14 and stud housing 12 exceed the maximum operating load to which the separation system may be subjected. Such a preload torquing force also produces normal forces upon the segmented fingers 26 in contact with the piston 16, effecting positive piston retention and displacing the fingers 26 inwardly when the piston 16 is forced away from the extremities of the fingers 26.

Actuation and separation of the stud member from the stud housing is accomplished by applying an axial force to the shaft greater than the frictional force developed between the segmented fingers and the piston during installation. This applied force drives the piston 16 forward until it abuts the inner face of the tubular section of the stud member 14. This movement of the piston 16 permits the segmented fingers 26 of the stud member 14 to deflect inwardly to assume a conical shape and thus to disengage from the mating threads of the stud housing. The driving impact of the piston 16 against the inner face of the stud member 14 provides a sufficient impulse to force the stud member 14 from the stud housing 12, thereby effecting positive stud separation. The rapid deflection of the segmented fingers during piston movement is provided by the potential energy developed in the fingers by the torque applied to the stud member 14 during assembly of the separation mechanism. As an example of the actual forces involved, one embodiment of a separation system constructed in accordance with the present invention was subjected to a tensile force of about 10,000 pounds. While subjected to such a tensile force, the axial force required for separation was about 260 pounds.

The separation system of the present invention can be used to separate a variety of mechanically-joined components. Specific applications include utilization of the present separation system in the jettisoning of rocket motors, the separating of rocket payloads and as a replacement for explosive bolts. Since separation of the mechanism is not dependent upon a large shock force, any type of suitable force-producing medium can be used as pressure source 34, including hydraulic, pneumatic, electromechanical or other equivalent means. Actuation can be accomplished by either pushing or pulling the piston. When the piston is pulled out of the tubular portion of the stud member in order to effect separation, the fingers of the stud member will assume a conical configuration and any tensile forces acting between the stud member and stud housing will cause the stud member 14 and stud housing 12 to separate.

The stud housing 12 and the piston 16 can be fabricated from aluminum or other similar lightweight material having high structural strength. The stud member 14 can be made from stainless steel or other similar material. Preferably, the piston 16 os of a material which is dissimilar to that of the stud member 14 in order to reduce friction between the periphery of the piston 16 and the internal surfaces of the segmented fingers 26 of the stud member 14.

It is thought that the invention and many of its attendant advantages will be understood from the foregoing description, and it will be apparent that various changes may be made in the instant construction without departing from the spirit and scope of the invention or sacrificing its material advantages, the form hereinbefore described being merely a preferred embodiment thereof.

It is claimed:

1. A separation system comprising:
   a. a stud member having a plurality of externally threaded projections disposed about the longitudinal axis of the stud member, said projections having end portions which are displaceable inwardly relative to said longitudinal axis,
   b. a piston member movably mounted within the stud member and retained by said projections at their end portions, said piston member being of such size as to maintain said projections in a position parallel to said longitudinal axis,
   c. threaded means for engaging said externally-threaded projections, and
   d. said piston being movable in a direction along the longitudinal axis of the stud member relative to said projections to permit said projections to become disengaged from said threaded means, thereby to separate said stud member from said threaded means.

2. The system of claim 1 wherein the projections normally have an overall conical shape.

3. The system of claim 3 wherein said threaded means includes a stud housing having an internally-threaded portion which is engageable with the threaded projections of said stud member when the projections are in a position parallel to said longitudinal axis.

4. The system of claim 3 wherein the major diameter of the threaded projections of the stud member is normally less than the minor diameter of the internally-threaded portion of the stud housing.

5. The system of claim 4 further including means associated with said stud housing for displacing the piston member within the stud member.

6. The system of claim 4 further including means associated with said stud housing for displacing the piston member outwardly from the stud member.

7. The system of claim 1 wherein said threaded means includes a stud housing having an internally-threaded portion which is engageable with the threaded projections of said stud member.

8. The system of claim 7 further including means associated with said stud housing for displacing the piston member within the stud member.

9. The system of claim 7 further including means associated with said stud housing for displacing the piston member outwardly from the stud member.

10. A separation system comprising:
   a. a stud member having a plurality of externally-threaded projections disposed about the longitudinal axis of the stud member, said projections being provided with an overall conical shape,
   b. a stud housing having an internally-threaded portion which is adapted to mate with the projections of the stud member when the projections are forced radially outwardly, the minor diameter of the internally-threaded portion of the stud housing being greater than the major diameter of the externally-threaded portion of the projections,
   c. a piston member adapted to be positioned within the projections of the stud member adjacent the end portions of the projections to force the projections radially outwardly so that the threaded projections of the stud member engage the corresponding internally-threaded portion of the stud housing and
   d. means for displacing the piston member to allow the projections of the stud member to move inwardly and assume their original conical shape so that the projections of the stud member are disengaged from the internally-threaded portion of the stud housing.

11. The system of claim 10 wherein the internally-threaded portion of the stud housing has an overall cylindrical shape.

12. The system of claim 11 wherein the piston member is displaced within the stud member.

13. The system of claim 11 wherein the piston member is displaced outwardly from the stud member.

* * * * *

UNITED STATES PATENT OFFICE
CERTIFICATE OF CORRECTION

Patent No. 3,696,488            Dated October 10, 1972

Inventor(s) Michael F. Steele and John S. Yates

It is certified that error appears in the above-identified patent and that said Letters Patent are hereby corrected as shown below:

Claim 3, line 1, change "claim 3" to --claim 2--.

Signed and sealed this 13th day of February 1973.

(SEAL)
Attest:

EDWARD M. FLETCHER, JR.            ROBERT GOTTSCHALK
Attesting Officer                      Commissioner of Patents